UNITED STATES PATENT OFFICE.

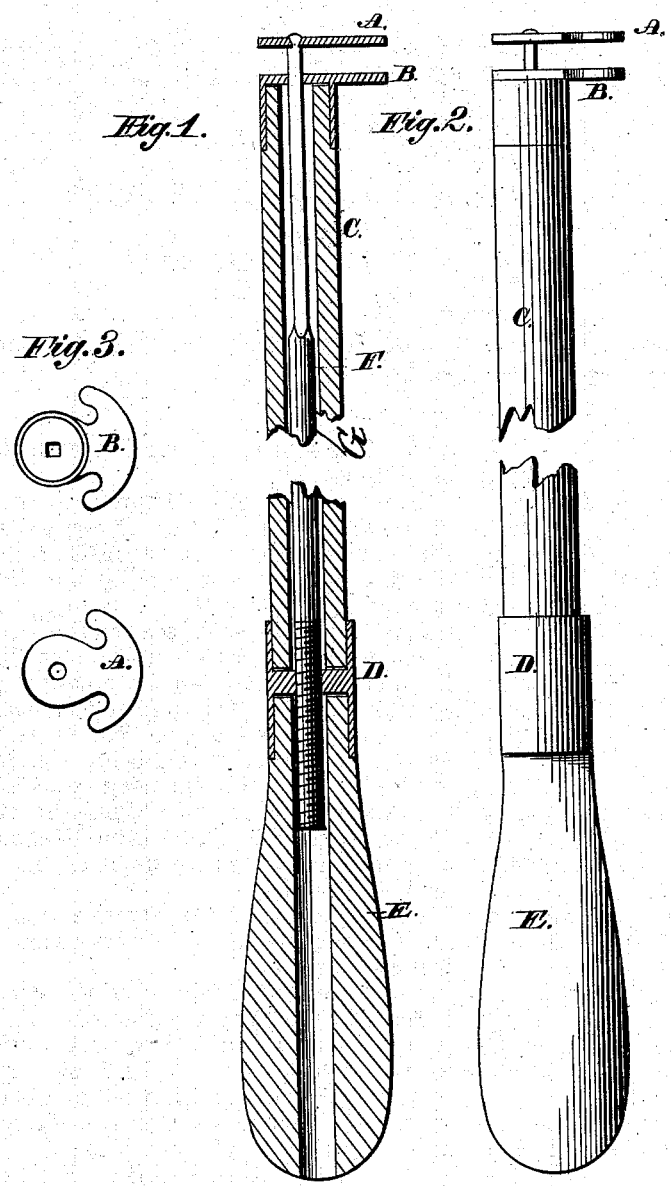

CHARLES P. PALMER, OF WEST CONCORD, VERMONT.

IMPROVEMENT IN LAMP-CHIMNEY CLEANERS.

Specification forming part of Letters Patent No. 186,609, dated January 23, 1877; application filed July 1, 1876.

*To all whom it may concern:*

Be it known that I, CHARLES P. PALMER, of West Concord, in the county of Essex and State of Vermont, have invented certain new and useful Improvements in Lamp-Chimney Cleaners; and I do hereby declare that the following is a full, clear, and exact description thereof, which will enable others skilled in the art to which it appertains to make and use the same, reference being had to the accompanying drawings, and the letters of reference marked thereon, which form a part of this specification, and in which—

Figure 1 is a sectional view. Fig. 2 is a side elevation; and Fig. 3 shows the lips or clamps detached.

Similar letters of reference indicate corresponding parts in all the figures.

This invention relates to certain improvements in lamp-chimney cleaners, as hereinafter more fully shown and described.

In the drawing, A B are two suitably-shaped lips or clamps, one of which, A, is secured to the end of a rod, G, sliding inside a tube, C, to the end of which the other clamp, B, is affixed. The upper end of the rod G is square, and passes through a square perforation in the clamp B. The lower end of rod G is screw-threaded, as shown in Fig. 2 of the drawing. D is a screw-threaded ring or nut, arranged upon the lower end of tube C, and engaging with the rod G, which is thus operated. The tube C is secured upon a suitable handle, E.

The operation of my improved lamp-chimney cleaner is as follows: The rod G is first slid upward by operating nut D, so as to bring the clamps A B apart. A rag, a quantity of raw cotton, or some other suitable soft material, is then placed between the clamps, which are now brought together by operating nut D, so as to tightly clasp the material placed between them. The implement may now be used for cleaning lamp-chimneys in the usual manner, the tube C being slender, and the lips A B small enough to pass into the smallest lamp-chimney. When the material placed between the lips A B has become dirty or worn, it may easily be renewed, in the manner described.

Having thus described my invention, I claim and desire to secure by Letters Patent of the United States—

The implement herein described, consisting of rod G, having, at its upper end, the clamp A, and at its lower end a screw-thread, engaging with the nut D, tube C, having clamp B, and handle E, all combined and operating substantially in the manner and for the purpose herein shown and specified.

CHARLES P. PALMER.

Witnesses:
OLIVER B. CUTTING,
STEPHEN M. MATTHEWS.